US008132232B2

(12) United States Patent
 Vasudevan

(10) Patent No.: US 8,132,232 B2
(45) Date of Patent: Mar. 6, 2012

(54) CONTROLLING ACCESS PRIVILEGES IN A WIRELESS DOMAIN

(75) Inventor: Swaminathan Vasudevan, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1100 days.

(21) Appl. No.: 11/776,870

(22) Filed: Jul. 12, 2007

(65) Prior Publication Data

US 2009/0019521 A1    Jan. 15, 2009

(51) Int. Cl.
*H04L 29/06* (2006.01)

(52) U.S. Cl. .............................. 726/3; 370/331; 370/351

(58) Field of Classification Search .................. 370/331, 370/351; 726/3
See application file for complete search history.

(56) References Cited

U.S. PATENT DOCUMENTS

| | | | |
|---|---|---|---|
| 6,982,949 B2 | 1/2006 | Guo et al. | |
| 6,992,994 B2 | 1/2006 | Das et al. | |
| 7,002,932 B1 | 2/2006 | Young et al. | |
| 7,058,181 B2 | 6/2006 | Wright et al. | |
| 7,072,340 B2 | 7/2006 | Agrawal et al. | |
| 7,146,636 B2 | 12/2006 | Crosbie | |
| 2007/0064673 A1* | 3/2007 | Bhandaru et al. | 370/351 |
| 2007/0153741 A1* | 7/2007 | Blanchette et al. | 370/331 |

OTHER PUBLICATIONS

IEEE 802 Committee of the IEEE Computer Society, "P802.11r/D6.0 Draft Standard for Information Technology . . . ," May 2007, 115 pages, IEEE, New York, NY, USA.
P. Congdon et al., "IEEE 802.1X RADIUS Usage Guidelines," Feb. 1, 2001, 15 pages, The Internet Society, USA.
C. Rigney et al., "Remote Authentication Dial in User Service (RADIUS)," Jun. 2000, 77 pages, The Internet Society, USA.

* cited by examiner

*Primary Examiner* — Vivek Srivastava
*Assistant Examiner* — Michael D Anderson

(57) ABSTRACT

Various systems, methods, and programs executable on a computer readable medium are provided for providing secure communications in a wireless domain. In one embodiment, a method is provided in which access to a network is established a client in an originating subnet associated with an originating controller in a wireless domain. The access rights for the client are set based upon a first active control list. Access to the network for the client is established in a foreign subnet associated with a foreign controller in the wireless domain when the client roams from the originating subnet to the foreign subnet. A second active control list is tunneled from the foreign subnet to the originating subnet. The access rights to the network for the client in the originating controller are reset based upon the second active control list.

18 Claims, 5 Drawing Sheets

CONTROLLING ACCESS PRIVILEGES IN A WIRELESS DOMAIN

BACKGROUND

The access rights to a network may vary from subnet to subnet for a given client in a wireless domain. For example, some subnets may be accessible to authorized personnel, whereas others might be accessible to the general public. As such, the access rights are varied according to subnets so as to ensure that unauthorized access to networks and files does not occur. Since access rights are varied, a typical user is required to log on to a wireless domain in each subnet in order to perform a back end authentication at each subnet. This causes a loss of continuity between subnets and other inefficiencies.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
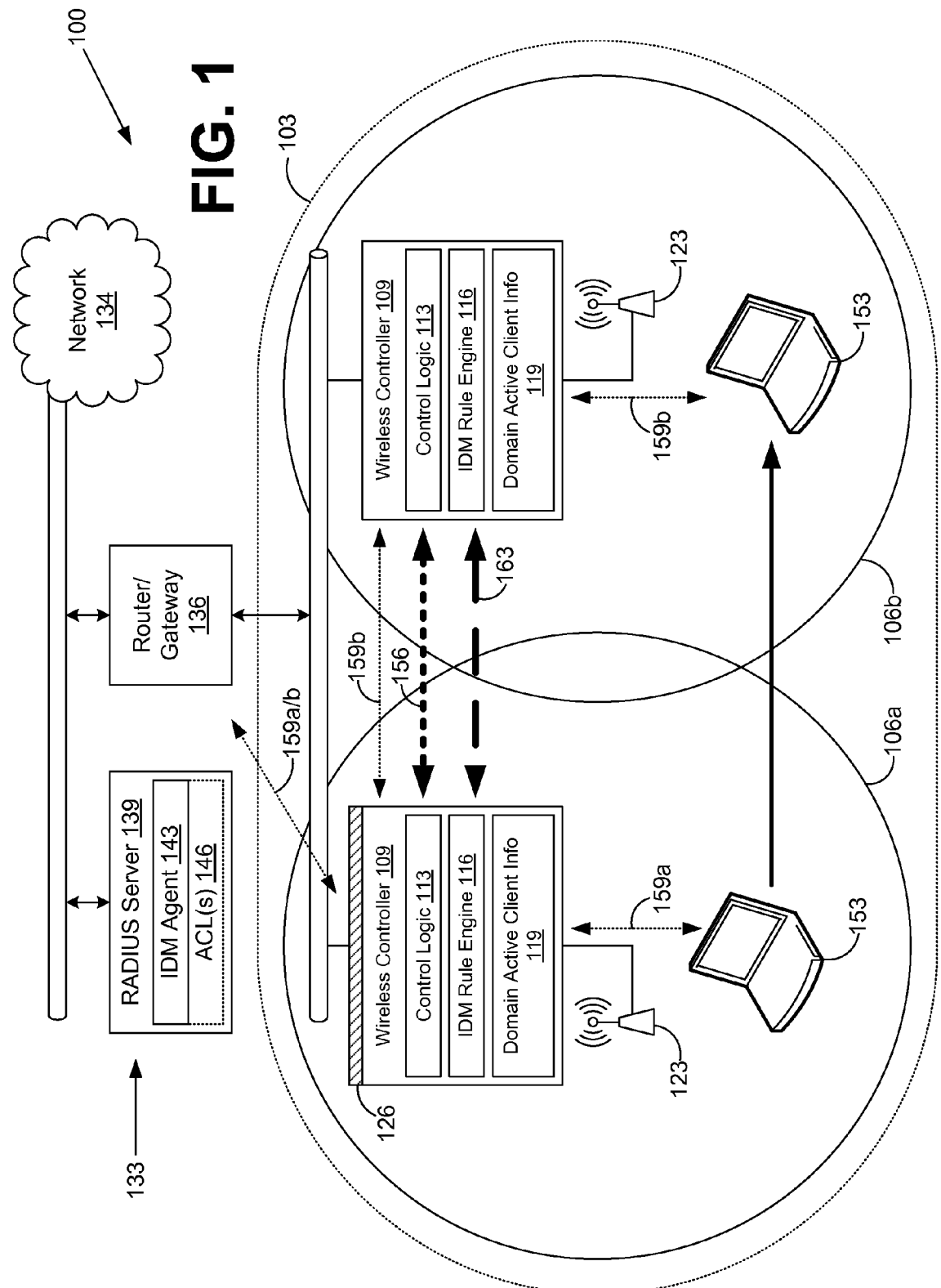
FIG. 1 is a schematic block diagram of an example of a wireless domain according to an embodiment of the present invention.

With reference to FIG. 1, shown is a network 100 that includes a wireless domain 103 having a plurality of subnets according to various embodiments of the present invention. The wireless domain 103 may comprise, for example, a layer 3 roaming domain or Mobility domain.

The subnets include an originating subnet 106a and a foreign subnet 106b as will be described. Included within the originating subnet 106a is an originating wireless controller 109 (also referred to as 109a). Also, included within the foreign subnet 106b is a foreign wireless controller 109 (also referred to as 109b). The originating and foreign wireless controllers 109a and 109b are essentially the same device, where each of the wireless controllers 109 can operate either as an originating or foreign device relative to a given client, depending upon where a client first logs in to the wireless domain.

There may be multiple foreign subnets 106b with corresponding foreign wireless controllers 109b within the wireless domain 103 as can be appreciated. The wireless controllers 109a/b act as access points within each of the respective subnets 106a/b to facilitate wireless access to the network 100 by clients. To this end, the wireless controllers 109a/b are examples of various devices that may act as an access point within the subnets 106a/b.

Included within each of the wireless controllers 109a/b is control logic 113, an identity driven management (IDM) rule engine 116, and domain active client information 119. Each wireless controller 109a/b is coupled to the wireless transceiver 123 as can be appreciated. The wireless transceiver 123 facilitates wireless communication to clients within the subnets 106a/b. The IDM rule engine 116 implements user access rights for clients to control the access a given client has to resources on the network 100.

The wireless domain 103 is coupled, for example, to an external network 133 through a router/gateway 136 as can be appreciated. The external network 133 may comprise, for example, a local area network, an intranet, the Internet, wide area network, or other network that may be coupled to other external networks 134 as can be appreciated. Within the external network 133 is a RADIUS server 139. The acronym "RADIUS" stands for "Remote Authentication Dial-In User Service" which is an authentication, authorization, and accounting protocol for applications providing network access or Internet protocol mobility. At the writing of this document, the RADIUS protocol is defined in the Request for Comment (RFC) 2865 entitled "Remote Authentication Dial-In User Service (RADIUS)" authored by C. Rigney, et al., as promulgated by the Network Working Group as published by the Internet Engineering Task Force at www.ietf.org dated June 2000.

Within the RADIUS server 139 is an identity driven management (IDM) agent 143 that includes active control lists 146 for various types of clients that may be coupled to the network 100. Thus, the active control lists 146 set forth access rights to various clients to the resources on the network 100. The IDM agent 143 may be implemented as a plug-in to the RADIUS server 139 in order to provide the active control lists 146 to wireless controllers 109a/b, for example, during the authentication of a client by the RADIUS server 139.

Within the wireless domain 103 is a client 153 that is capable of roaming from the originating subnet 106a to the foreign subnet 106b. The control logic 113 of each of the wireless controllers 109a/b is configured to provide wireless access to network 100 for the client 153 when the client 153 roams from the originating subnet 106a to the foreign subnet 106b, as will be discussed. When a client 153 initially logs on to the network 100, the originating wireless controller 109a in the originating subnet 106a implements a respective active control list 146 for the client 153 to provide access rights to the client 153 to resources on the external network 133.

Next, the operation of a network 100 in implementing active control lists 146 for respective clients 153 within given wireless controllers 109 is described according to various embodiments of the present invention. First, the client 153 wishes to gain access to the external network 133 through the originating wireless controller 109a located in the originating subnet 106a. To this end, the originating subnet 106a is termed the "originating" subnet as it is the subnet within which the client 153 is first authenticated in the wireless domain 103.

When the client 153 initiates communications with the originating wireless controller 109a, it exchanges its MAC address, a username, a password or other information with the originating wireless controller 109a. The control logic 113 of the wireless controller 109a then requests that the RADIUS server 139 authenticate the client 153. In this respect, the client may be an individual with specific access to various services on the network 100. Alternatively, the user of the client 153 may be a guest with respect to the network 100 and may only be entitled to limited access rights. In addition, other types of users may wish to gain access to various resources on the network 100.

Upon receiving the authentication information from the client 153, the RADIUS server 139 will proceed to authenticate the client 153. During this process, the RADIUS server 139 interfaces with the IDM agent 143 to identify an active control list 146 for the client 153. Once the active control list 146 is identified, the RADIUS server 139 sends an authentication reply to the wireless controller 109*a* along with the active control list 146 associated with the client 153. Upon receiving the active control list 146 from the RADIUS server 139, the control logic 113 provides the same to the IDM rule engine 116 that employs the active control list 146 to create a barrier 126 that regulates access rights for the client 153 on the external network 133.

In addition, the control logic 113 informs the foreign wireless controller(s) 109*b* associated with one or more foreign subnets 106*b* as to the identity of client 153 in the form of a service ID, MAC address, or other information. The control logic 113 also informs the foreign wireless controller(s) 109*b* associated with one or more foreign subnets 106*b* as to the identity of the wireless controller 109*a* located in the originating subnet 106*a* associated with the client 153. The originating wireless controller 109*a* communicates with all of the foreign wireless controllers 109*b* within the wireless domain 103 through a generic routing encapsulation (GRE) tunnel 156 that exists between wireless controllers 109*a/b* within a given wireless domain 103 as can be appreciated.

Once the client 153 is authenticated and the active control list 146 implemented in the originating wireless controller 109*a*, the client 153 may then communicate wirelessly through the originating wireless controller 109*a* and obtain access to the external network 133 based upon the access rights afforded to the client 153. In this respect, the authentication of the client 153 by the RADIUS server 139 is a "back end" authentication. During the authentication, the RADIUS server 139 assigns an IP address to the client 153 so that data traffic can flow back to the client 153 as can be appreciated.

Thus, initially the client 153 communicates to the external network 133 through a first communication route 159*a* extending from the client through the originating wireless controller 109*a* in the originating subnet 106*a* and to the external network 133. When the client 153 roams from the originating subnet 106*a* to a foreign subnet 106*b*, then the client 153 establishes communication with the foreign wireless controller 109*b* and provides identification information such as a MAC address or a service ID that identifies the client 153 to the foreign wireless controller 109*b* in the foreign subnet 106*b*. The foreign wireless controller 109*b* then looks up the client in the domain active client information 119 to identify both the client 153 and the originating wireless controller 109*a* in the wireless domain 103.

The control logic 113 in the foreign wireless controller 109*b* in the foreign subnet 106*b* then obtains the active control list 146 for the client from the RADIUS server 139 for use within the foreign subnet 106*b*. Thereafter, the foreign wireless controller 109 transmits this active control list 146 to the originating wireless controller 109*a* in the originating subnet 106*a* by way of an active control list tunnel 163 according to various embodiments of the present invention. The active control list 146 implemented in the foreign wireless controller 109*b* may be different from the active control list 109 that was implemented in the originating wireless controller 109*a*. This may be the case, for example, where the foreign wireless controller 109*b* is located in a physical location that may be a public place where access to critical resources on the network 133 due to the possibility of eaves dropping, etc.

The control logic 113 in the originating wireless controller 109*a* in the originating subnet 106*a* then implements the active control list 146 received from the foreign wireless controller 109*b* in the foreign subnet 106*b* such that the access rights for the client 153 are those that are associated with the foreign subnet 106*b*. This is the case even though the active control list 146 from the foreign subnet 106*b* is implemented in the originating wireless controller 109*a* in the originating subnet 106*a*.

Thereafter, data flowing to and from the client 153 proceeds through the foreign wireless controller 109*b* in the foreign subnet 106*b* and is tunneled to the originating wireless controller 109*a* by way of the data path 159*b* before it is sent to the external network 133 as shown. As a result of the tunneling of the data over the pathway 159*b*, the client 153 maintains the same IP address received when logging on the system at the originating wireless controller 109*a*.

This is advantageous as the client 153 can maintain continuity in the connection when transitioning between the originating subnet 106*a* and the foreign subnet 106*b* without losing data that may be in the transmission during the handoff. Also, if the user's access rights change due to the location of the client 153 in the foreign subnet 106*b* having roamed there from the originating subnet 106*a*, then any data transmitted at the time of the transition to the foreign subnet 106*b* will cease transmission in accordance with the newly implemented access rights for the client 153. This reflects the fact that some subnets 106 within a given wireless domain 103 may be accessible by more individuals than others (i.e., such as subnets in public areas) that might result in eavesdropping by third parties when in such subnets. As such, access rights may be reduced in such areas.

Figure 2:
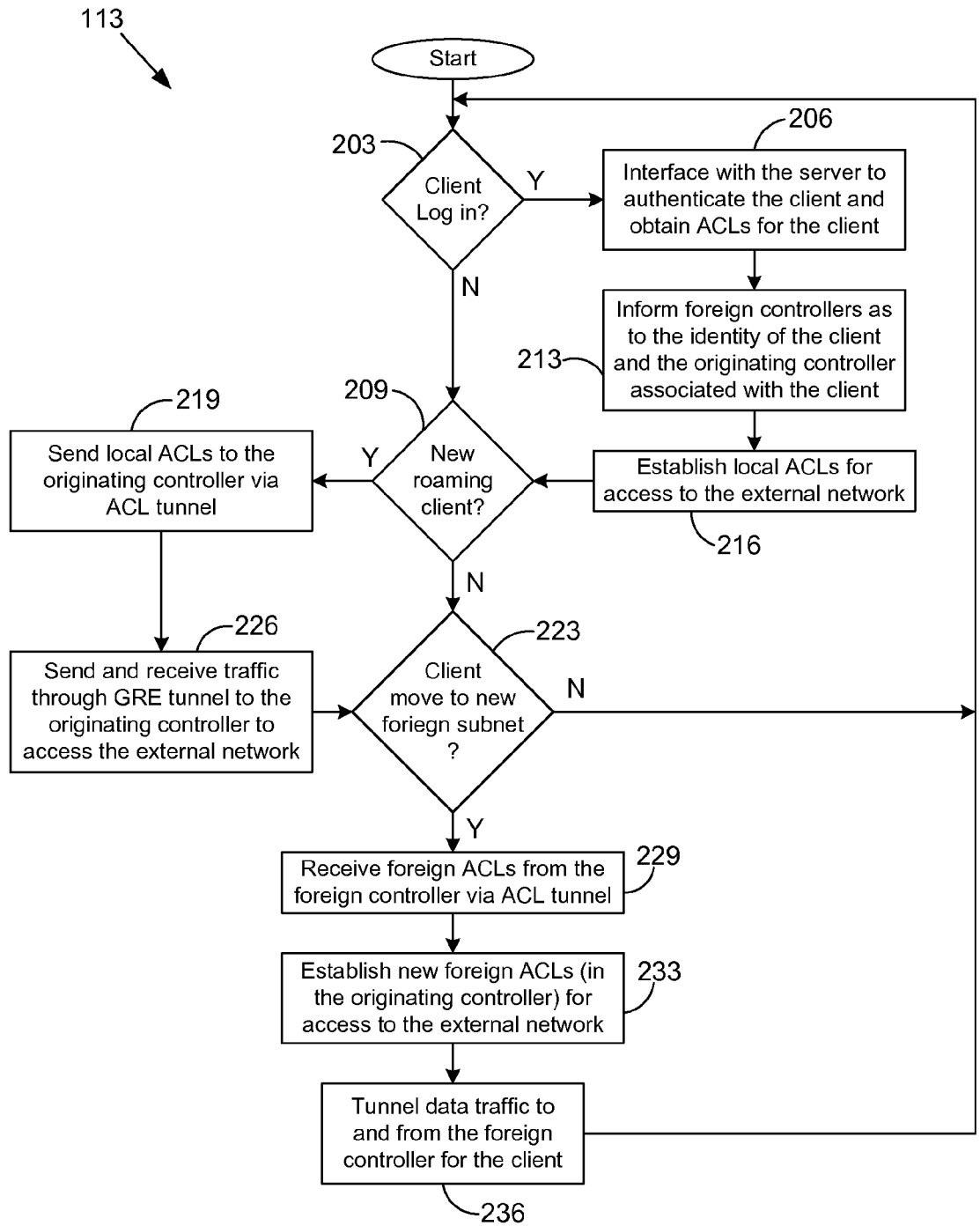
FIG. 2 is a flow chart of an example of the functions of a wireless controller in the wireless domain of FIG. 1 that are implemented to ensure proper access privileges are provided to clients according to an embodiment of the present invention.

Next, with reference to FIG. 2, shown is a flowchart that illustrates one example of a component of the control logic 113 of the wireless controllers 109*a/b* (FIG. 1) in implementing access rights based on active control lists for clients 153 (FIG. 1) that roam among the subnets of a wireless domain 103 (FIG. 1) according to an embodiment of the present invention. Alternatively, the flow chart of FIG. 2 may be viewed as depicting steps of an example of a method implemented in the controllers 109 to establish access rights based on active control lists for clients 153 that roam among the subnets of a wireless domain 103. The control logic 113 may be implemented using any one of a number of programming languages as can be appreciated.

Beginning with box 203, the control logic 113 determines whether a client 153 is to be logged in and authenticated against the RADIUS server 139. If so, then the control logic 113 proceeds to box 206. Otherwise, the control logic 113 progresses to box 209.

In box 206, the control logic 113 interfaces with the RADIUS server 139 to authenticate the client 153 and to obtain an active control list 146 for the client 153. Then, in box 213, the control logic 113 informs foreign controllers 109 as to the identity of the client 153 and the originating controller 109 associated with the client 153. The identity of the client 153 may comprise a service ID, MAC address, or other information as can be appreciated. Thereafter, in box 216, the control logic 113 establishes a local active control list 146 in the wireless controller 109 to establish access rights for the client 153 to the external network 133 (FIG. 1). Thereafter, the control logic 115 proceeds to box 209 as shown.

Next, in box 209, the control logic 113 determines whether a client 153 has roamed into the subnet 106 associated with the wireless controller 109 within which the control logic 113 is executed. Such may be determined when the client 153 attempts to communicate with the controller 109 and provides its identification and information such as a service ID, MAC address, or other information. The client that roams into the subnet 106 of the controller 109 within which the control logic 113 is executed will have roamed to such position from an originating subnet 106a. To this end, the current subnet into which the client roams is a foreign subnet 106b. This is the case as the client 153 that roams into the subnet as determined in box 209 is one that was authenticated in a different originating subnet as can be appreciated.

Assuming that the client 153 has roamed into the subnet as determined in box 209, then the control logic 113 proceeds to box 219 in which the active control list 146 associated with the wireless controller 109 within which the control logic 113 is executed is sent to the originating controller 109 of the originating subnet 106a via the active control list tunnel 163. In order to obtain the active control list 146 for the client 153, the control logic 113 may be configured to request the active control list 146 for the client from the RADIUS server 139. The current wireless controller 109 receives the active control list 146 via a backend authentication via the RADIUS server 139.

Thereafter, in box 226, the control logic 113 forwards all data traffic to and from the client 153 through the GRE tunnel 156 to the originating controller 109 within the originating subnet 106a through which the data flows to and from the external network 133. Then, the control logic 113 proceeds to box 223 as shown.

In box 223, it is determined whether a client that logged in as per boxes 203, 206, 213, and 216 has moved to a foreign subnet 106b. If not, then the control logic 113 reverts back to box 203 as shown. Otherwise, the control logic 113 proceeds to box 229 in which the active control list 146 from the foreign controller 109 is received by way of the active control list tunnel 163. Thereafter, in box 233 the new active control list is established in the controller 109 for access to the external network 133. To do so, the control logic 113 may interface with the IDM rule on an engine 116 to implement the active control lists 146 from the foreign subnet. Thereafter, in box 236, data traffic is received from the foreign controller 109 in the foreign subnet 106b. Also, traffic is transmitted to the foreign controller 109 to the client as can be appreciated. Thereafter, the control logic 113 reverts back to box 203 as shown.

In addition, it is understood that the control logic 113 may include many other functions beyond those described above, where the above flowchart provides one illustration of the implementation of active control lists for a client within a wireless domain 103 in order to facilitate roaming without requiring a new back end authentication every time the client 153 moves from a first subnet 106 to a second subnet as can be appreciated.

Figure 3:
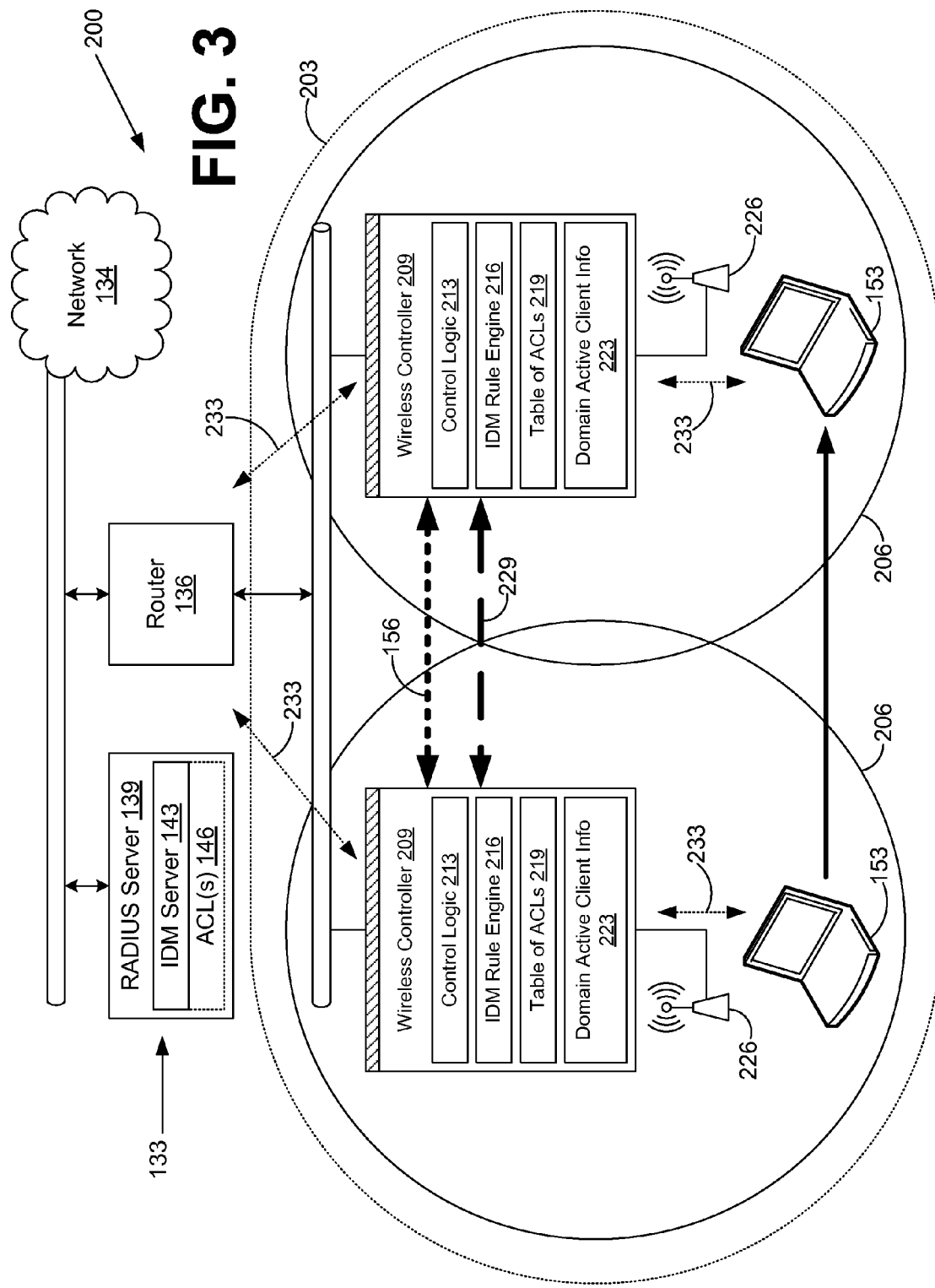
FIG. 3 is a schematic block diagram of another example of a wireless domain according to an embodiment of the present invention.

With reference to FIG. 3, shown is a network 200 according to another embodiment of the present invention. The network 200 is similar to the network 100 (FIG. 1) with the exception that the network 200 involves an 802.11r wireless domain 203 in place of the wireless domain 103 according to an embodiment of the present invention. The 802.11r wireless domain 203 includes subnets 206. Within each subnet are wireless controllers 209 as shown. The wireless controllers 209 include control logic 213, an IDM rule engine 216, a table of active control lists 219, and domain active client information 223. The wireless controllers 209 are each coupled to a transceiver 226 for wireless communication with client device 153 in the subnets 206. The wireless controllers 209 are representative of various components that act as access points in the domain 203 as can be appreciated.

Next, a discussion of the operation of the 802.11r wireless domain 203 is provided. To begin, a client 153 initially logs into the 802.11r wireless domain 203 by communicating with one of the wireless controllers 209. The respective wireless controller 209 then transmits a request to the RADIUS server 139 to authenticate the client 153 on the network 200. In response to the request, the RADIUS server 139 interfaces with the IDM server 143 to obtain a table of active control lists 146 for the client 153 for each of the subnets 206 of the current 802.11r wireless domain 203.

The table of active control lists 146 includes an individual active control list 146 for each of the subnets 206 within the 802.11r wireless domain 203 for the client 153. In any one of the wireless controllers 209, a single one of the active control lists 146 included within the table of active control lists 219 provided by the server 139 is employed to provide access rights to the client 153 to the external network 133.

The RADIUS server 139 also provides an authentication key along with the table of active control lists 219 to the respective wireless controller 209 for the client 153. Upon receiving the authentication key and the table of active control lists 219 from the RADIUS server 139, the wireless controller 209 generates a second key from the authentication key and the MAC address of the client 153. The wireless controller 209 then forwards the keys and the MAC address for the client to all of the other wireless controllers 209 within the 802.11r wireless domain 203. Thereafter, communication with the external network 133 is established by the wireless controller 209 using the active control lists 146 from the table of active control lists 219 associated with the given wireless controller 209.

If the client roams to another subnet 206 from the originating subnet, the new wireless controller 209 will recognize the client based upon a service ID, MAC address, or other identifying information stored with the domain active client information 223. Given that the keys and the MAC address from the client were forwarded from the prior wireless controller 209, the new wireless controller may then request the table of active control lists 219 from the wireless controller 209 of the subnet 206 from which the client 153 has roamed. The table of active control lists 219 is communicated to the new wireless controller 209 from the old wireless controller 209 through an active control list tunnel 229.

The wireless controller 209 of the subnet 206 into which the client 153 has roamed can then perform a local authentication of the client using the keys and the MAC address of the client and will select an active control list 146 from the table of active control lists 219 obtained from the previous wireless controller 209 to implement access rights for the client 153 in the new subnet 206. Once the previous wireless controller 209 has pushed the table of active control lists 219 to the new wireless controller 209 of the subnet 206 into which the client 153 has roamed, then the previous wireless controller 209 ceases to provide network access to the client 153. In a sense, the table of active control lists 219 follows the client 153 to the 802.11r wireless domain 203.

By virtue of this embodiment, data communication from the client 153 to the external network 133 is accomplished through a single wireless controller 209 at a time over a respective data path 233.

Figure 4:
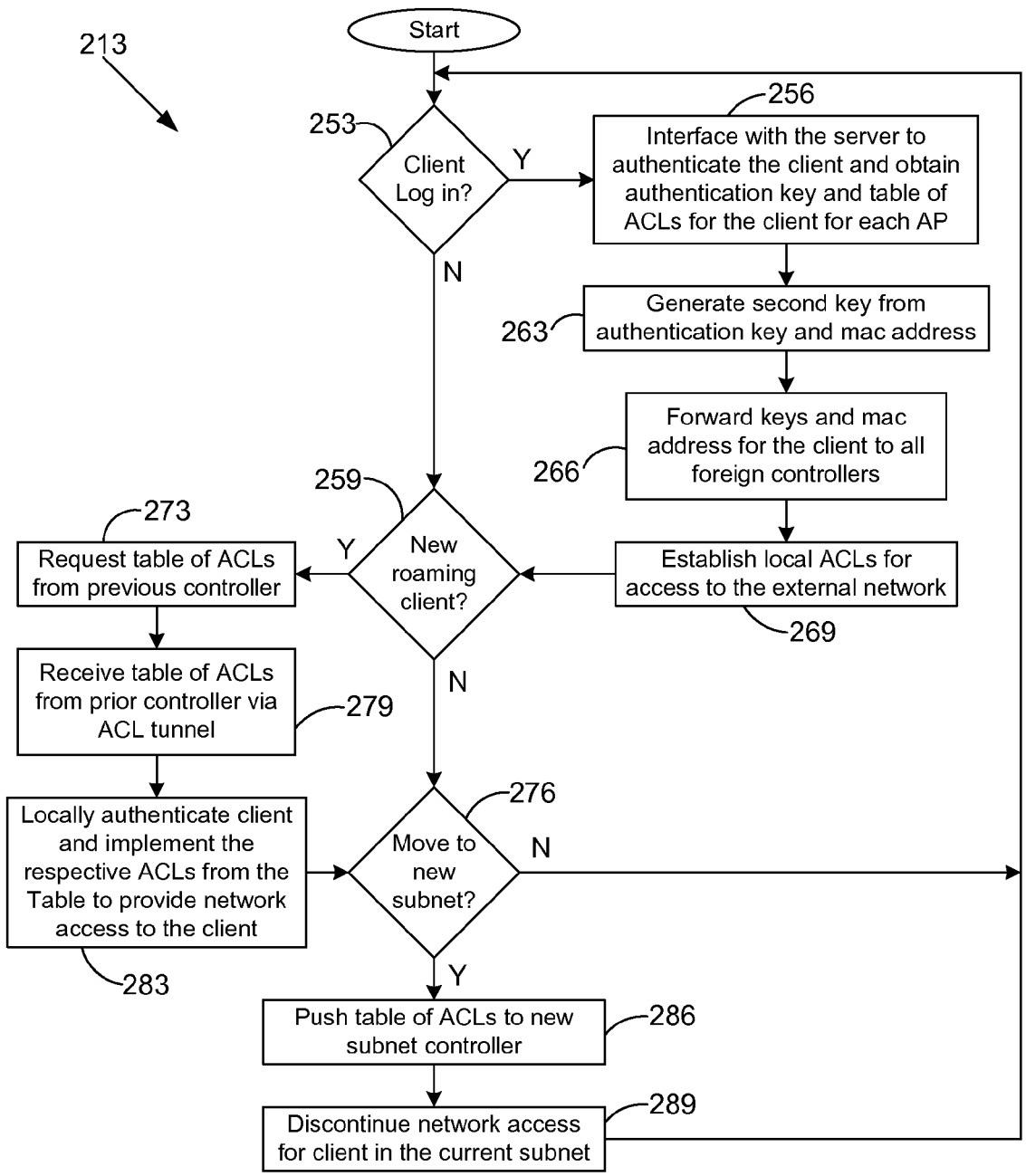
FIG. 4 is a flow chart of an example of the functions of a wireless controller in the wireless domain of FIG. 3 that are implemented to ensure proper access privileges are provided to clients according to an embodiment of the present invention.

With reference to FIG. 4, shown is a flowchart that illustrates one example of a component of the control logic 213 within the wireless controllers 209 (FIG. 3) according to an embodiment of the present invention. Alternatively, the flow chart of FIG. 4 may be viewed as depicting steps of an example of a method implemented in the controllers 209 to establish access rights based on active control lists for clients 153 (FIG. 3) that roam among the subnets of the wireless domain 203 (FIG. 3). The control logic 113 may be implemented using any one of a number of programming languages as can be appreciated.

Beginning with box 253, the control logic 213 determines whether a client 153 (FIG. 3) is attempting to log in to be authenticated by the RADIUS server 139 to gain access to the network 200. If so, then the control logic 213 proceeds to box 256. Otherwise, the control logic proceeds to box 259. Assuming the control logic has proceeded to box 256, then the control logic 213 interfaces with the RADIUS server 139 to authenticate the client 153 and obtain the authentication key and table of active control lists 219 for the client 153 for each access point or wireless controller 209 within the 802.11r wireless domain 203 (FIG. 3).

In box 263, a second key is generated from the authentication key and the MAC address of the client 153. The second key is used for local authentication of a client in other wireless controllers 209 of the 802.11r wireless domain 203 for subnets 206 into which the client 153 may roam in the future.

Next, in box 266, both the authentication key and the second key, as well as the MAC address of the client 153 are forwarded to all of the foreign controllers within the 802.11r wireless domain 203 so that they can authenticate the client 153 in their respective subnets 206. Then, in box 269, the active control list 146 associated with the current wireless controller 209 is established at the wireless controller 209 to provide access rights to the client 153 to the external network 133. Thereafter, the control logic 213 proceeds to box 259.

In box 259, the control logic 213 determines whether a client 153 has roamed into its respective subnet 206. This may be determined, for example, by establishing wireless communications with the client 153 in obtaining information about the client 153 such as a service ID or a MAC address, etc. Assuming that such is the case, then the control logic 213 proceeds to box 273. Otherwise, the control logic 213 proceeds to box 276.

In box 273, the control logic 213 requests the table of active control lists 219 from the controller 209 associated with the subnet 206 from which the client 153 has roamed. The request is sent via the active control list (ACL) tunnel 229. Then, in box 279, the table of active control lists 219 is received by the current wireless controller 209 via the ACL tunnel 229.

Then, in box 283, the control logic 213 locally authenticates the client using the authentication key, the second key, and the MAC address obtained from the client and implements the respective active control list 146 from the table of active control lists 219 for the given wireless controller 209 associated with the subnet 206 into which the client 153 has roamed. The active control list 146 that is implemented from those included in the table of active control lists 219 is the one that is associated with the current wireless controller 209. In this manner, access rights are established for the client in the new subnet 206. Thereafter, the control logic 213 proceeds to box 276.

Assuming that the control logic 213 proceeds to box 276, then the control logic 213 determines whether the client 153 within its given subnet has moved to a new subnet 206. If such is the case, then in box 286, the wireless controller 209 of the subnet 206 recently left by the client 153 pushes the table of active control lists 219 to the new wireless controller 209 in response to the request from the respective wireless controller 209 received via the ACL tunnel 229. Then, in box 289, the wireless controller 209 discontinues providing network access for the client in its subnet 206 since the client 153 has left the subnet and entered a separate subnet. Thereafter, the control logic 213 reverts back to box 253.

In addition, it is understood that the flowchart of FIG. 4 provides one example of some of the functionality implemented in the control logic 213. It is understood that other functions important for the operation of the wireless controllers 209 may be performed by the control logic 213 as well.

Figure 5:
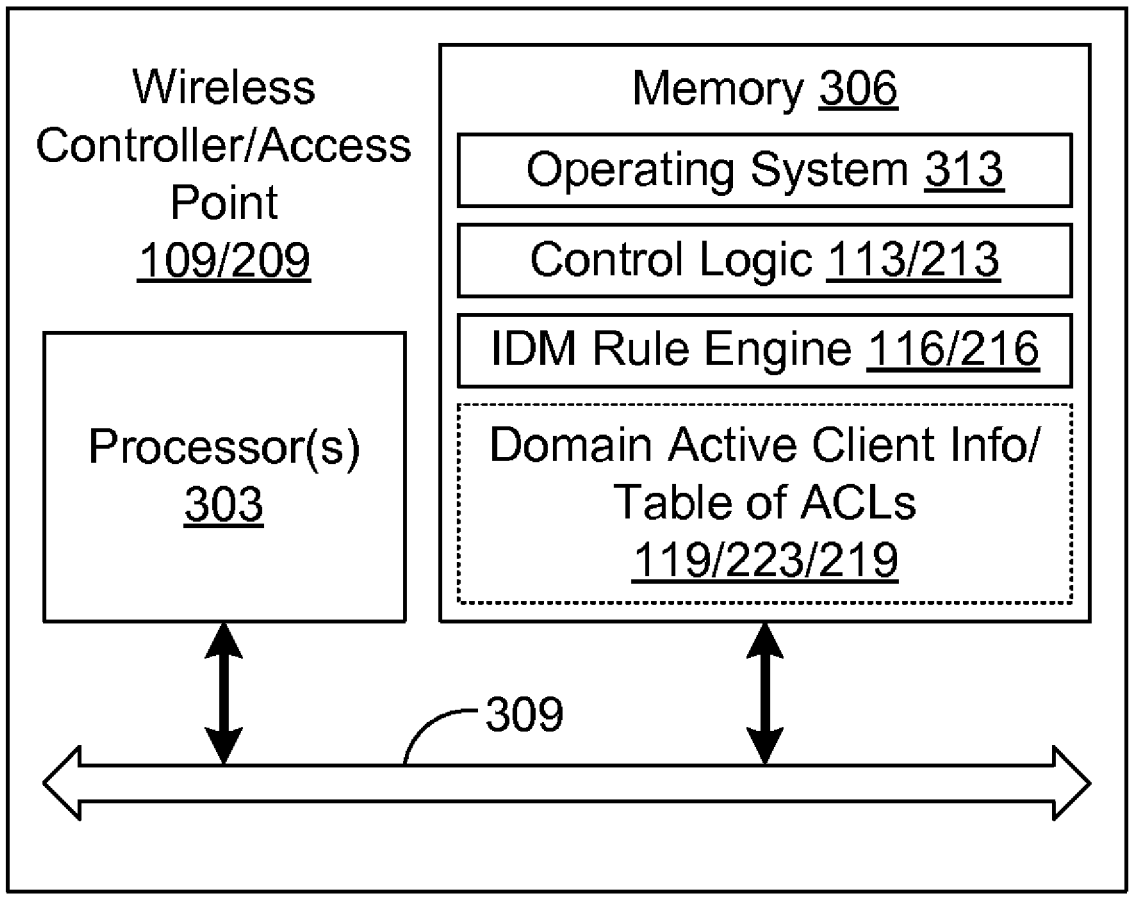
FIG. 5 is a schematic block diagram of a system processor based controller implemented in the wireless domains of FIG. 1 or 3 according to an embodiment of the present invention.

With reference to FIG. 5, shown is one example of a wireless controller/access point 109/209. To this extent, the device shown may comprise a wireless controller 109/209 or some other device that acts as an access point in a wireless domain 103/203 (FIG. 1/FIG. 3) according to an embodiment of the present invention.

The wireless controller/access point 109/209 includes a processor circuit having a processor 303 and a memory 306, both of which are coupled to a local interface 309. The local interface 309 may comprise, for example, a data bus with an accompanying control/address bus as can be appreciated. Stored within the memory 306 and executable by the processor 303 is an operating system 313, the control logic 113/213, the IDM rule engines 116/216, and the domain active client information 119/223 and/or the table of active control lists 219. In this respect, the wireless controller 109/209 or other access point is implemented as a processor circuit in which the control logic 113/213 is embodied as software executable by the processor 303 as can be appreciated.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network that facilitates communication between any two of the multiple processors, between any processor and any one of the memories, or between any two of the memories etc. The processor 303 may be of electrical or optical construction, or of some other construction as can be appreciated by those with ordinary skill in the art.

Although the control logic 113/213 is embodied in software or code executed by general purpose hardware as discussed above, as an alternative the same may also be embodied in dedicated hardware or a combination of software/general purpose hardware and dedicated hardware. If embodied in dedicated hardware, the control logic 113/213 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 1-4 show the architecture, functionality, and operation of an implementation of the control logic 113/213. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 2 and 4 show a specific order of execution, it is understood that the order of execution may differ from that which is depicted. For example, the order of execution of two or more blocks may be scrambled relative to the order shown. Also, two or more blocks shown in succession in FIGS. 2 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the control logic 113/213 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the control logic 113/213 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for providing secure communications in a wireless domain, comprising the steps of:
    establishing access to a network for a client in an originating subnet associated with an originating controller in a wireless domain;
    setting access rights to the network for the client in the originating controller based upon a first active control list;
    establishing access to the network for the client in a foreign subnet associated with a foreign controller in the wireless domain when the client roams from the originating subnet to the foreign subnet;
    tunneling a second active control list from the foreign subnet to the originating subnet; and
    resetting access rights to the network for the client in the originating controller based upon the second active control list.

2. The method of claim 1, further comprising the step of tunneling data to and from the client between the originating and foreign controllers, where the originating controller remains as an access point to the network for the client.

3. The method of claim 1, wherein the step of establishing access to the network for the client in the originating subnet further comprises the step of authenticating the client against an identity driven management (IDM) server.

4. The method of claim 1, further comprising the step of pushing identification information associated with the client from the originating controller to the foreign controller when establishing access to a network for a client in an originating subnet.

5. A system for providing secure communications in a wireless domain, comprising:
    a controller having a processor circuit, the controller being configured to establish a subnet in a wireless domain, the controller including control logic executable by the processor circuit to provide access to a network for a client, the control logic comprising:
    logic that sets access rights to the network for the client based upon a first active control list received from an identity driven management server;
    logic that facilitates communication with a foreign controller via an active control list tunnel, where a second active control list from the foreign controller associated with a foreign subnet is received through the active control list tunnel when the client roams to the foreign subnet; and
    logic that resets the access rights to the network for the client in the controller based upon the second active control list.

6. The system of claim 5, wherein the control logic further comprises logic that tunnels data destined to and received from the client though the foreign controller, where the controller is configured to act as access point to the network for the client when the client roams to the foreign subnet.

7. The system of claim 1, wherein the control logic further comprises logic to request an authentication of the client from an identity driven management (IDM) server.

8. The system of claim 1, wherein the control logic further comprises logic that pushes identification information associated with the client from the controller to the foreign controller when establishing access to the network for the client in the subnet.

9. A system for providing secure communications in a wireless domain, comprising:
- a controller having a processor circuit, the controller being configured to establish a subnet in a wireless domain, the controller including control logic executable by the processor circuit to provide access to a network for a client, the control logic comprising:
  - means for setting access rights to the network for the client based upon a first active control list received from an identity driven management server;
  - means for facilitating communication with a foreign controller via an active control list tunnel, where a second active control list from the foreign controller associated with a foreign subnet is received through the active control list tunnel when the client roams to the foreign subnet; and
  - logic that resets the access rights to the network for the client in the controller based upon the second active control list.

10. A method for providing secure communications in a wireless domain, comprising the steps of:
- establishing access to a network for a client in a first subnet associated with a first controller in a wireless domain by authenticating the client against an identity driven management server;
- storing an active control list table received from the identity driven management server in the first controller, the active control list table associating a plurality of active control lists with a corresponding number of subnets in the wireless domain;
- setting access rights to the network for the client in the first controller based upon a first active control list associated with the first subnet in the active control list table;
- establishing access to the network for the client in a second subnet associated with a second controller in the wireless domain when the client roams from the first subnet to the second subnet; and
- pushing the active control list table from the first controller to the second controller via an active control list tunnel.

11. The method of claim 10, further comprising the step of setting access rights to the network for the client in the second controller based upon a second active control list associated with the second subnet in the active control list table.

12. The method of claim 10, further comprising the steps of:
- generating a request for the active control list table in the second controller upon identifying that the client has roamed to the second subnet; and
- sending the request from the second controller to the first controller via the active control list tunnel, where the first controller pushes the active control list table to the second controller in response to the request.

13. A system for providing secure communications in a wireless domain, comprising:
- a controller having a processor circuit, the controller being configured to establish a subnet in a wireless domain, the controller including control logic executable by the processor circuit to provide access to a network for a client, the control logic comprising:
  - logic that sets access rights to the network for the client based upon a first active control list received from an identity driven management server, the first active control list being taken from a table that lists a plurality of active control lists in association with a corresponding plurality of subnets;
  - logic that pushes the table of active control lists to a foreign controller via an active control list tunnel when the client roams to the foreign subnet; and
  - logic that discontinues access to the network for the client in the subnet after the client roams to the foreign subnet.

14. The system of claim 13, the control logic further comprising logic that generates a request for the active control list table associated with a client that entered that subnet from a prior subnet.

15. The system of claim 14, the control logic further comprising logic that sends the request to the prior controller associated with the prior subnet via the active control list tunnel.

16. A system for providing secure communications in a wireless domain, comprising:
- a controller having a processor circuit, the controller being configured to establish a subnet in a wireless domain, the controller providing access to a network for a client, the controller further comprising:
  - means for setting access rights to the network for the client based upon a first active control list received from an identity driven management server, the first active control list being taken from a table that lists a plurality of active control lists in association with a corresponding plurality of subnets; and
  - means for pushing the table of active control lists to a foreign controller via an active control list tunnel when the client roams to the foreign subnet.

17. The system of claim 16, the control logic further comprising means for generating a request for the active control list table associated with a client that entered that subnet from a prior subnet.

18. The system of claim 17, the control logic further comprising means for sending the request to the prior controller associated with the prior subnet via the active control list tunnel.

* * * * *

UNITED STATES PATENT AND TRADEMARK OFFICE
CERTIFICATE OF CORRECTION

PATENT NO. : 8,132,232 B2
APPLICATION NO. : 11/776870
DATED : March 6, 2012
INVENTOR(S) : Vasudevan Page 1 of 1

It is certified that error appears in the above-identified patent and that said Letters Patent is hereby corrected as shown below:

In the Claims

In column 10, line 57, in Claim 6, delete "though" and insert -- through --, therefor.

In column 10, line 60, in Claim 7, delete "claim 1" and insert -- claim 5 --, therefor.

In column 10, line 63, in Claim 8, delete "claim 1" and insert -- claim 5 --, therefor.

Signed and Sealed this
Twenty-fourth Day of September, 2013

Teresa Stanek Rea
*Deputy Director of the United States Patent and Trademark Office*